US012802002B2

(12) United States Patent
Maddipati et al.

(10) Patent No.: US 12,802,002 B2
(45) Date of Patent: Nov. 17, 2026

(54) SAFE SITE NAVIGATION AND SMART PLANT MANAGEMENT

(71) Applicant: GE Vernova Infrastructure Technology LLC, Greenville, SC (US)

(72) Inventors: Phanindra Maddipati, Houston, TX (US); Anand Vegunta, Houston, TX (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 99 days.

(21) Appl. No.: 18/703,149

(22) PCT Filed: Sep. 21, 2022

(86) PCT No.: PCT/US2022/076761

§ 371 (c)(1),
(2) Date: Apr. 19, 2024

(87) PCT Pub. No.: WO2023/076771

PCT Pub. Date: May 4, 2023

(65) Prior Publication Data

US 2025/0013944 A1 Jan. 9, 2025

Related U.S. Application Data

(60) Provisional application No. 63/271,261, filed on Oct. 25, 2021.

(51) Int. Cl.
*G06Q 10/0631* (2023.01)
*G06Q 50/26* (2024.01)

(52) U.S. Cl.
CPC ....... *G06Q 10/0631* (2013.01); *G06Q 50/265* (2013.01)

(58) Field of Classification Search
CPC .......................................... G06Q 10/00–50/00
(Continued)

(56) References Cited

U.S. PATENT DOCUMENTS 10,311,705 B1 * 6/2019 Aljuaid .............. G05B 19/0428
10,395,499 B2 * 8/2019 Kritzler ................ G06Q 50/265
(Continued)

FOREIGN PATENT DOCUMENTS

WO 2016/118690 A1 7/2016
WO 2020/181152 A1 9/2020

OTHER PUBLICATIONS

Rahman, Md Mahbubur, et al. "An automated methodology for worker path generation and safety assessment in construction projects." IEEE Transactions on Automation Science and Engineering 15.2 (2016): 479-491. (Year: 2016).*
(Continued)

*Primary Examiner* — Alan S Miller
(74) *Attorney, Agent, or Firm* — Armstrong Teasdale LLP

(57) ABSTRACT

A system and method for safe site navigation through an industrial operating environment is provided. The system can include a first computing device communicatively coupled to a second computing device via a network. The second computing device can include at least one data processor configured to receive first data from the first computing device. The first data identifying an industrial equipment configured in an oil and gas production environment. The at least one data processor can determine, based on the first data, second data including a visual depiction of the industrial equipment and can provide, to the first computing device, the visual depiction for display on the first computing device.

17 Claims, 6 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 11,675,878 | B1 * | 6/2023 | Pandya | G01S 17/86 382/103 |
| 11,710,085 | B2 * | 7/2023 | Alsahlawi | G06N 3/09 706/12 |
| 12,598,271 | B1 * | 4/2026 | Pandya | G06V 20/52 |
| 2008/0262795 | A1 * | 10/2008 | Webb | G05B 23/0283 702/183 |
| 2013/0197951 | A1 * | 8/2013 | Watson | G06Q 10/06 705/7.12 |
| 2017/0132884 | A1 * | 5/2017 | Kumar | G08B 21/043 |
| 2019/0228631 | A1 * | 7/2019 | Stinson | G06Q 10/0635 |
| 2019/0236370 | A1 * | 8/2019 | Man | G06Q 10/0633 |
| 2019/0236931 | A1 * | 8/2019 | Strebel | G08B 7/06 |
| 2020/0210912 | A1 * | 7/2020 | Buhulaiga | G05B 9/02 |
| 2021/0158207 | A1 * | 5/2021 | Alsahlawi | G06F 18/214 |
| 2021/0216773 | A1 * | 7/2021 | Bohannon | G06V 20/20 |
| 2025/0013944 | A1 * | 1/2025 | Maddipati | G06Q 10/0635 |

OTHER PUBLICATIONS

Golovina, Olga, Jochen Teizer, and Nipesh Pradhananga. "Heat map generation for predictive safety planning: Preventing struck-by and near miss interactions between workers-on-foot and construction equipment." Automation in construction 71 (2016): 99-115. (Year: 2016).*

Li, Haibo. "Research on safety monitoring system of workers in dangerous operation area of port." 2017 4th International Conference on Transportation Information and Safety (ICTIS). IEEE, 2017. (Year: 2017).*

Noorudheen, Nusra, et al. "Keeping track workers safe: A socio-technical analysis of emerging systems and technology." Proceedings of the Institution of Mechanical Engineers, Part F: Journal of Rail and Rapid Transit 227.5 (2013): 517-528. (Year: 2013).*

* cited by examiner

SAFE SITE NAVIGATION AND SMART PLANT MANAGEMENT

CROSS-REFERENCE TO RELATED APPLICATIONS

This application claims priority under 35 U.S.C. § 119 to U.S. Provisional Patent Application No. 63/271,261, entitled "Safe Site Navigation and Smart Plant Management," and filed on Oct. 25, 2021. The entire contents of which is hereby expressly incorporated by reference herein.

TECHNICAL FIELD

The subject matter described herein relates to navigation, location tracking, and management of personnel and equipment in an industrial environment.

BACKGROUND

Asset management systems often include a variety of features for directly accessing and managing aspects of industrial equipment. Often the industrial equipment can be located in hazardous or unsafe area for human operators to pass-through or enter in order to assess the equipment. The hazardous areas can require specific personal-protective equipment (PPE) to be worn by operators in order to safely evaluate the equipment. Often the equipment must be accessed along a specific route or navigation path, which can traverse one or more hazardous areas. It can be challenging for operators to determine a safe, non-hazardous path to reach a particular piece of industrial equipment or to determine what PPE should be worn to safely navigate to the equipment. Existing asset management systems lack the features necessary to properly inform operators of safe or non-safe areas, a suitable route through safe areas to avoid non-safe areas, and timely, specific indications of the necessary PPE that should be worn to traverse to the industrial equipment along specific navigation routes.

SUMMARY

The subject matter herein can include a server, a client computing device, and a database forming a system to provide safe navigation within an industrial operating environment, such as an oil and gas production environment. The system can be configured in relation to an asset management system associated with monitoring and managing one or more pieces of industrial equipment. The system can interface with existing functionality of the asset management system and can provide additional, new features not provided by the asset management system. For example, the system described herein can enable personnel location tracking, route planning and route adjustment, equipment monitoring and assessment, and provision of PPE data.

In one aspect a system is provided. In one embodiment, the system can include a first computing device including a display. The system can also include a second computing device communicatively coupled to the first computing device via a network. The second computing device can include at least one data processor and a memory storing non-transitory computer readable instructions, which when executed by the at least one data processor can cause the at least one data process to perform operations comprising receiving from the first computing device first data identifying an industrial equipment configured in an oil and gas production environment. The operations can also include determining based on the first data, second data including a visual depiction of the industrial equipment. The operations can further include providing to the first computing device, the visual depiction for display on the first computing device.

One or more variations of the system can also be provided. For example, in one embodiment, the first data can include a QR code scanned by the first computing device. In another embodiment, the second data can further include maintenance data associated with a past inspection of the industrial equipment. In another embodiment, the first data can be received responsive to a work permit generated in response to a fault alarm at the industrial equipment. In another embodiment, the visual depiction can include a map identifying the industrial equipment and a navigable path to a safe destination location.

In another embodiment, the map can include at least one personal protective equipment requirement corresponding to the industrial equipment. In another embodiment, the visual depiction can be provided in near real-time as the first data is received by the first computing device. In another embodiment, the visual depiction can include an equipment diagram showing schematic drawings of the industrial equipment. In another embodiment, the equipment diagram can identify hazardous and non-hazardous areas of the industrial equipment. In another embodiment, the visual depiction can include a site diagram showing an egress route and an emergency assembly point.

In another aspect, a method is provided. In one embodiment, the method can include receiving, by a data processor of a server device, first data identifying an industrial equipment configured in an oil and gas production environment. The first data can be received from a client device communicatively coupled to the server device via a network. The method can also include determining, by the data processor of the server device based on the first data, second data can include a visual depiction of the industrial equipment. The method can further include providing, by the data processor of the server device, the visual depiction to the client device. The client device can be configured to display the visual depiction on a display of the client device.

One or more variations of the method can also be provided. For example, in one embodiment, the first data can include a QR code scanned by the first computing device. In another embodiment, the second data can further include maintenance data associated with a past inspection of the industrial equipment. In another embodiment, the first data can be received responsive to a work permit generated in response to a fault alarm at the industrial equipment. In another embodiment, the visual depiction can include a map identifying the industrial equipment and a navigable path to a safe destination location.

In another embodiment, the map can include at least one personal protective equipment requirement corresponding to the industrial equipment. In another embodiment, the visual depiction can be provided in near real-time as the first data is received by the first computing device. In another embodiment, the visual depiction can include an equipment diagram showing schematic drawings of the industrial equipment. In another embodiment, the equipment diagram can identify hazardous and non-hazardous areas of the industrial equipment. In another embodiment, the visual depiction can include a site diagram showing an egress route and an emergency assembly point.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
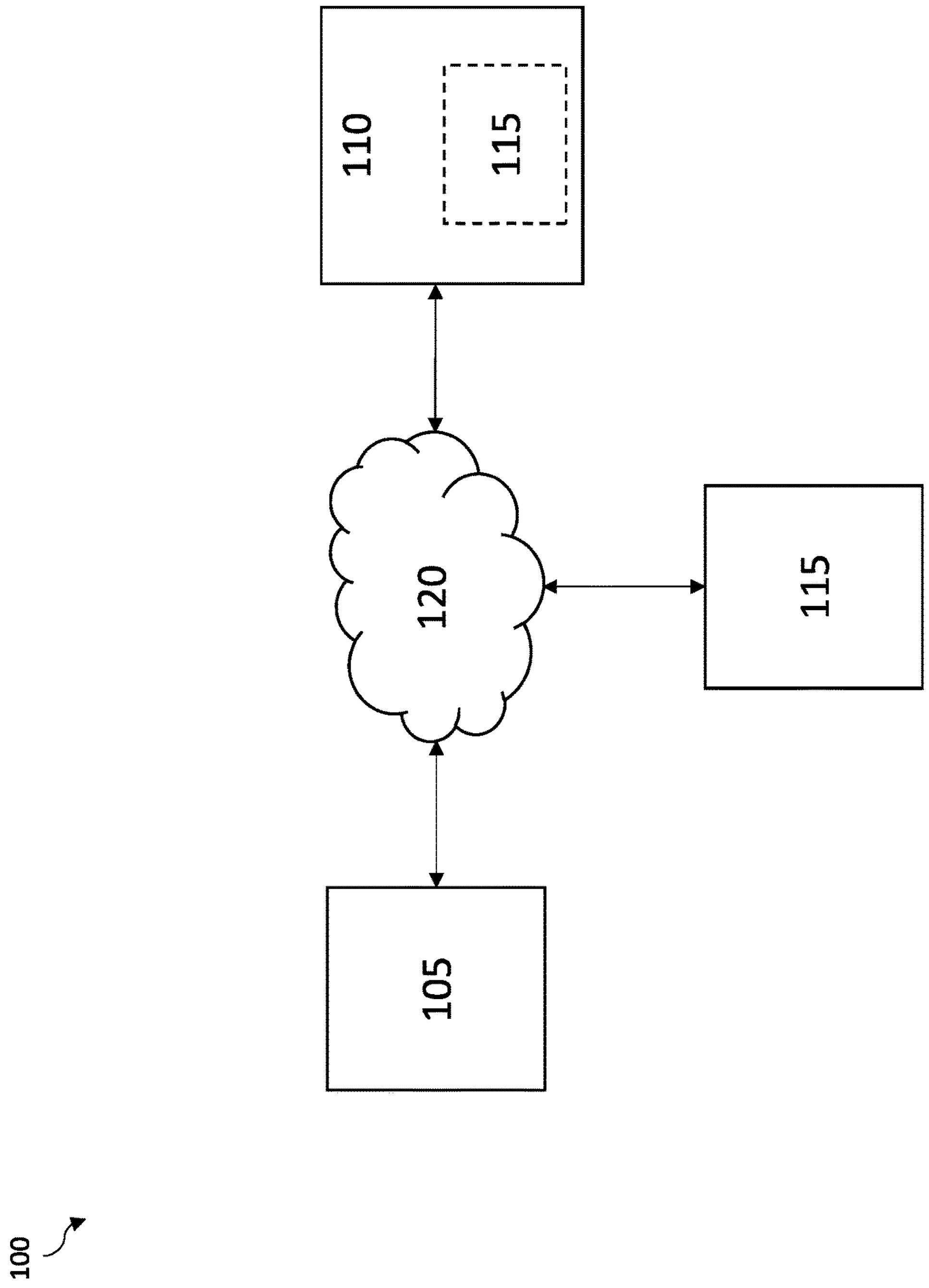
FIG. 1 is a diagram illustrating an example architecture of a system according to subject matter described herein.

Industrial environments can include a variety of industrial equipment that can be located in safe, non-hazardous locations, as well as equipment located in un-safe, hazardous locations. Operators assigned to evaluate, fix, and maintain the equipment can be required to navigate through hazardous areas to perform a task in relation to the equipment. It can be advantageous for operators to be aware of the location of the un-safe, hazardous areas, in addition to safe, non-hazardous areas to retreat to in the event of an emergency. Often, large industrial environments have a small, dispersed team of operators on-site who must rely on individual experiences and personal knowledge to safely navigate to the equipment using the appropriate PPE and to perform tasks in regard to the industrial equipment.

Existing asset management systems often do not provide live indications or tracking of locations of individual operators who have been deployed or assigned to evaluate or address an issue with a particular piece of equipment. With no live tracking, the location of operators in hazardous environments or their status in safe environments may not be known. Traditional asset management systems also tend not to include navigation features to aid new or less experienced operators locating the equipment, or distinguishing hazardous and non-hazardous locations in the industrial environment. It can be advantageous to enable these features, which are lacking from existing asset management systems, in hand-held computing devices which operators can carry with them as they navigate through hazardous and non-hazardous areas to evaluate and monitor industrial equipment.

The system and methods described herein can address the shortcomings of existing asset management systems to provide safe navigation routes and re-routing from hazardous locations in an industrial environment. In some embodiments, the system and methods can provide notifications or alerts in regard to an operators live, real-time location, PPE status or requirements, route or navigation planning, or the like. The system and methods described herein can help operators of an industrial environment safely and with proper protective equipment carry out tasks associated with the equipment irrespective of their level of expertise or personal knowledge of hazardous conditions near or at the site at which the equipment is located.

The system and methods described herein can provide various users of the system with better real-time information about the location and status of operators in the industrial environment. This can be advantageous, not only for accessing equipment and traversing hazardous areas to access the equipment, but also during emergency evacuations. The systems and methods herein can provide safe, accurate evacuation routes and maps to non-hazardous meeting points. Integration with other data systems, such as enterprise resource planning (ERP) applications or permit to work (PTW) systems can also be configured with the system described herein such that maintenance activities can be performed on the equipment safely and efficiently even for operators or maintenance personnel with little to no prior experience at the site of the equipment. In some embodiments, the system described herein can be configured in an oil and gas production environment, although the system can be deployed in other environments without limit.

FIG. 1 is a diagram illustrating an example architecture of a system according to subject matter described herein. As shown in FIG. 1, the architecture 100 can include a client device 105, a server 110, and a database 115 coupled via a network 120. In some embodiments, data can be exchanged between the client device 105, the server 110, and the database 115.

The client device 105 can include a variety of form-factors, such as a mobile computing device, a laptop computer, a desktop computer, a smart phone, a tablet computing device, or the like. In some embodiments, the client device 105 can be an inspection device used to inspect industrial equipment, such as a video borescope, or the like. In some embodiments, the client device 105 can include one or more applications configured within the system described herein. For example, the client 105 can include a computing device, a processor, and a memory storing computer readable, executable instructions, which when executed by the processor cause the processor to perform methods via the applications. In some embodiments, the applications can include an ERP application, a PTW application, a global positioning system (GPS) application, a route guidance and navigation application, an equipment identification application, or the like.

The server 110 can similarly include a processor, and a memory storing computer readable, executable instructions, which when executed by the processor cause the processor to perform methods via applications stored on the server 110 or configured via the instructions in memory. The server 110 can be configured to receive data from the client device 105 and to generate data associated with route guidance or navigation, industrial equipment, PPE, alerts, notifications, or the like. For example, the server 110 can determine and provide route or navigation data in the form of maps, directions, and identifying features of industrial equipment or the industrial environment in which the equipment is located. The server 110 can receive GPS data from client devices 105 and can generate route and navigation data for operators. In some embodiments, the server 110 can determine and provide re-routing or dynamically generated routes or navigation paths to operators. The server 110 can provide up-to-date and live tracking data for operators in the industrial environment. The server 110 can determine and generate alerts or notifications associated with PPE that is required or specific to a particular piece of equipment or area of the industrial environment. In some embodiments, the server 110 can include a database, such as database 115 shown in dashed lines in FIG. 1.

The database 115 can include a memory or similar data storage format used to store data and applications associated with the industrial equipment, maps or route and navigation data, PPE, and the like. For example, the database 115 can include models of the plant or industrial environment. The models can include 3D models and map data identifying hazardous and non-hazardous areas of the industrial environment. The database 115 can also include equipment data, such as spare and inventory stores or records for components of the industrial equipment. The equipment data can include QR codes or similar data identifying the equipment. The database 115 can include historical or trouble shooting data associated with defects or maintenance issues related to the equipment. The database 115 can include inventory data describing the location and availability of spare parts for the equipment. The database 115 can also include a device or instrument database, calibration reports, equipment data sheets, and operating procedures describing safe operation practices for the industrial equipment. In some embodiments, the database 115 can include PTW data and shift log data.

The network 120 can include, for example, any one or more of a personal area network (PAN), a local area network (LAN), a campus area network (CAN), a metropolitan area network (MAN), a wide area network (WAN), a broadband network (BBN), the Internet, and the like. Further, the network 120 can include, but is not limited to, any one or more of the following network topologies, including a bus network, a star network, a ring network, a mesh network, a star-bus network, tree or hierarchical network, and the like.

Figure 2:
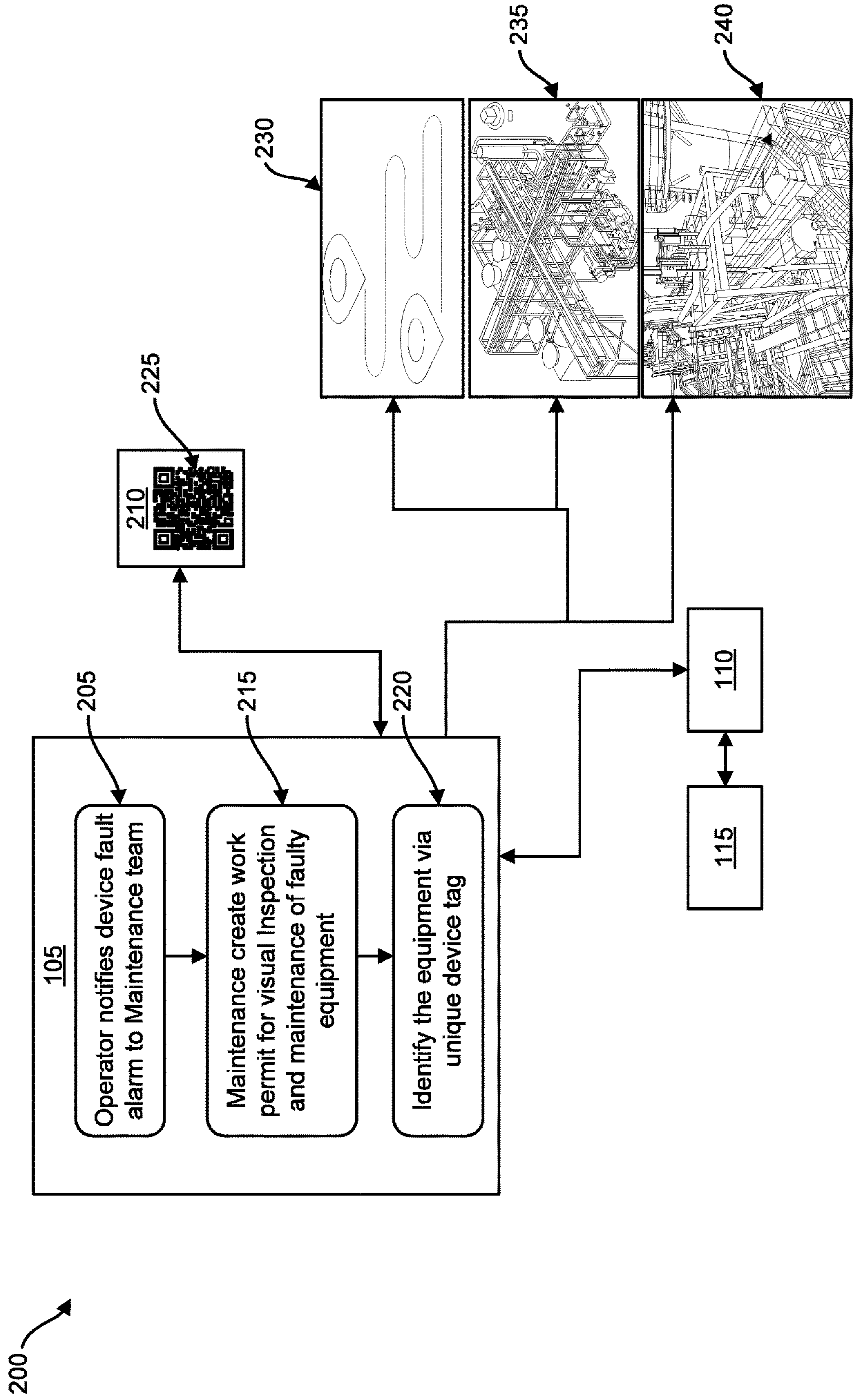
FIG. 2 is a diagram illustrating a workflow enabled using the system of FIG. 1.

FIG. 2 is a diagram illustrating a workflow 200 enabled using the system of FIG. 1. As shown in FIG. 2, the workflow 200 can be performed using client device 105, server 110, and database 115, all of which may communicate over a network 120. A client device 105 of the system described herein can include a maintenance application or a PTW application configured to monitor and alert operators in regard to a state or condition of a piece of industrial equipment.

At 205, an operator performing an inspection of a piece of industrial equipment 210 using a client device 105 configured can generate an alert or indication of a fault alarm at a particular location for members of a maintenance team. The industrial equipment 210 can be a machinery or component thereof located within an oil and gas production environment. For example, the equipment 210 can include a valve, a compressor, an engine, a turbine, a storage vessel, a pipe, a pipeline or the like. At 215, the maintenance team can open or create a work permit to inspect the equipment and provide necessary maintenance of the equipment in regard to the fault alarm. At 220, the maintenance team can identify the equipment 210 by searching the database 115 for the unique device tag 225 associated with the equipment 210. For example, the client device 105 can be a hand-held inspection device configured with a QR code scanner used to scan the QR code 225 and identify the equipment 210. In response, the client device 105 can receive from the database 115 via the server 110 past maintenance data of the equipment 210 and necessary inspection or maintenance procedure to address the fault alarm. The client device 105 can also receive from the database 115 via the server 110 PPE requirement details necessary for operators to perform the maintenance.

As further shown in FIG. 2, the workflow 200 can include providing one or more displays of navigation data and/or visual depictions of the equipment or industrial site. The navigation data and/or visual depictions of the equipment or industrial site can be stored in the database 115 and provided to the client device 105 via the server device 110. For example, the client device 105 can receive and provide a map 230 including a current location of the operator/client device 105, a safe destination location, and a route or navigation path to reach the safe destination location. The map 230 can be provided in regard to the equipment to be assessed, as well as during egress due to emergency situations. For example, the map 230 can include a navigation route to access or egress from the equipment via safe routes that avoid hazardous areas. The map 230 can also be configured to display PPE requirements for accessing the equipment or egressing from the equipment or navigating hazardous areas. The map 230 can be configured to provide real-time tracking of operators and guidance to nearest assembly points in case of emergencies.

As further shown in FIG. 2, the workflow 200 can include the client device 105 can receive and provide equipment diagrams 235. The equipment diagrams 235 can include schematic diagrams of the equipment and identify hazardous and non-hazardous areas of the equipment. The client device 105 can also receive and provide site diagrams 240. The site diagrams 240 can highlight hazardous and non-hazardous areas of the industrial site at which the equipment can be located, egress or evacuation routes, and assembly points. The equipment diagrams 235 and the site diagrams 240 can also indicate locations at which specific PPE is required.

Figure 3:
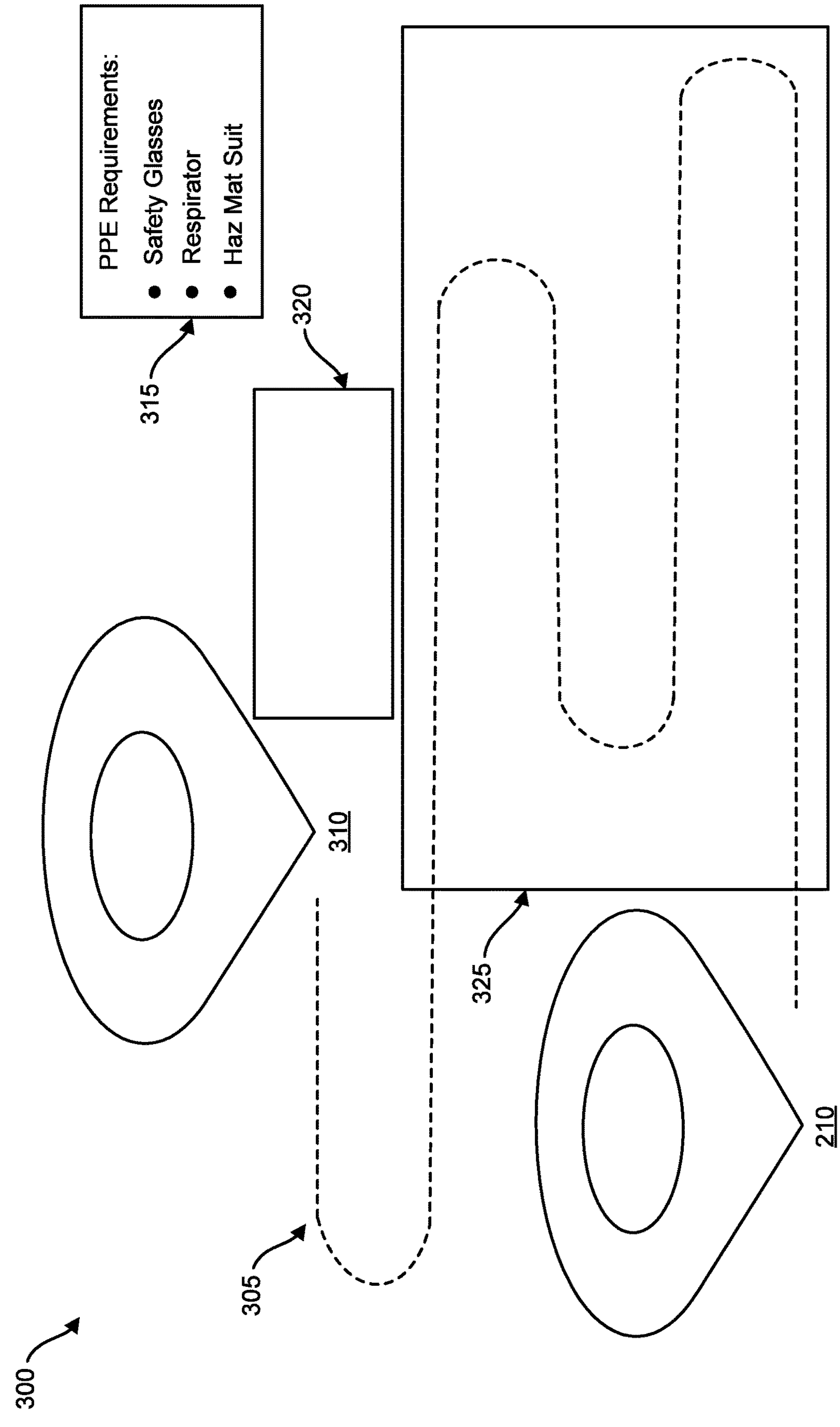
FIG. 3 is an image of an exemplary embodiment of a map identifying industrial equipment and a navigable path to a safe destination location generated by the system of FIG. 1.

FIG. 3 is an image of an exemplary embodiment of a map 300 identifying industrial equipment 210 and a navigable path 305 to a safe destination location 310. The map can be generated by the system of FIG. 1. In some embodiments, the map 300 can be provided on a display of the client device 105. The map 300 can include one or more PPE requirements 315 that can be required to be worn or utilized when in proximity of the industrial equipment 210. The path 305 can be determined to avoid hazardous areas 320 and thus route a user only through non-hazardous areas 325.

Figure 4:
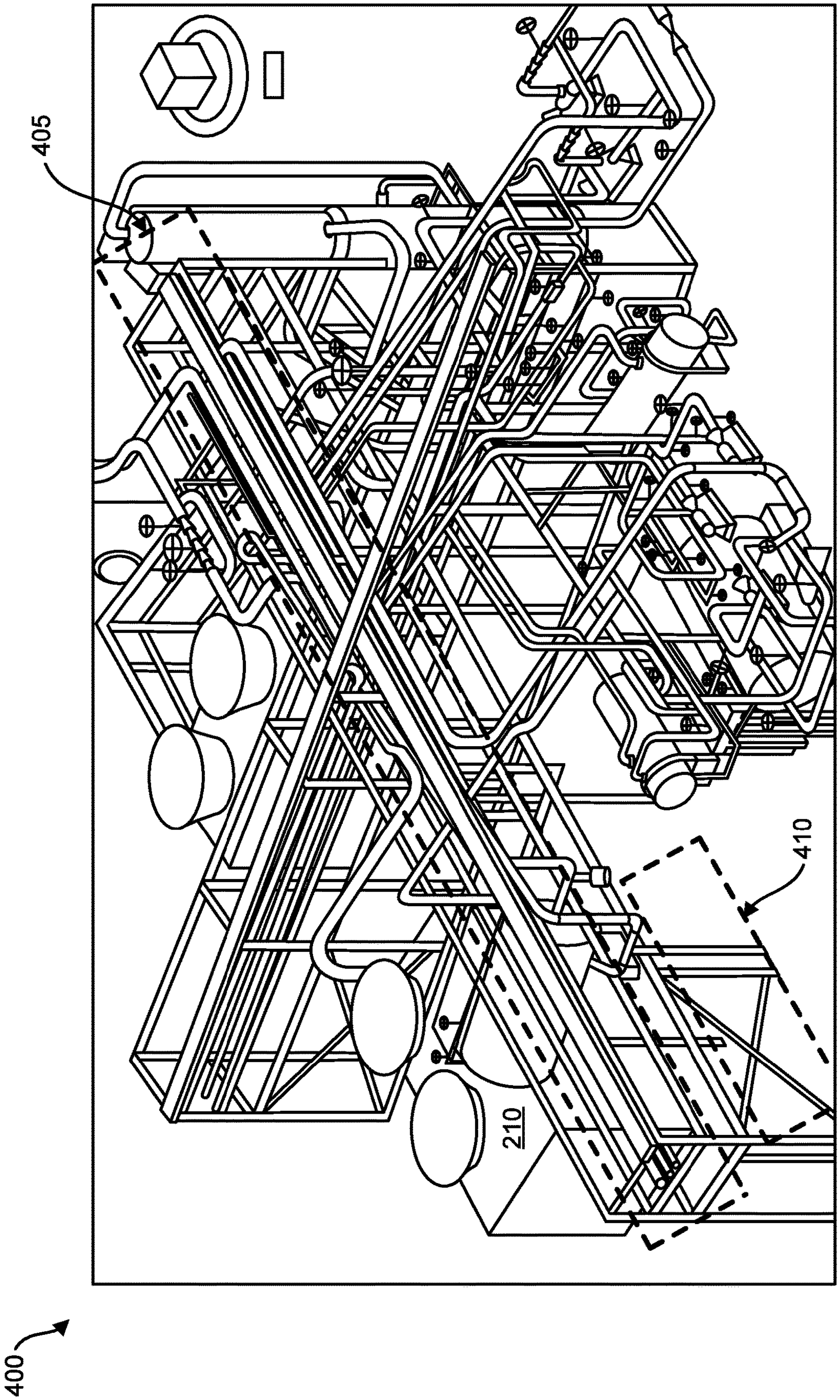
FIG. 4 is an image of an exemplary embodiment of an equipment diagram of the industrial equipment generated by the system of FIG. 1.

FIG. 4 is an image of an exemplary embodiment of an equipment diagram 400 of the industrial equipment 210. The equipment diagram 400 can be generated by the system of FIG. 1 and can include schematic drawings of the industrial equipment 210. In some embodiments, the equipment diagram 400 can identifying hazardous areas 405 and non-hazardous areas 410 of the industrial equipment 210. In this way, a user can safely traverse the non-hazardous area 410 to access the industrial equipment 210 and avoid the hazardous areas 405.

Figure 5:
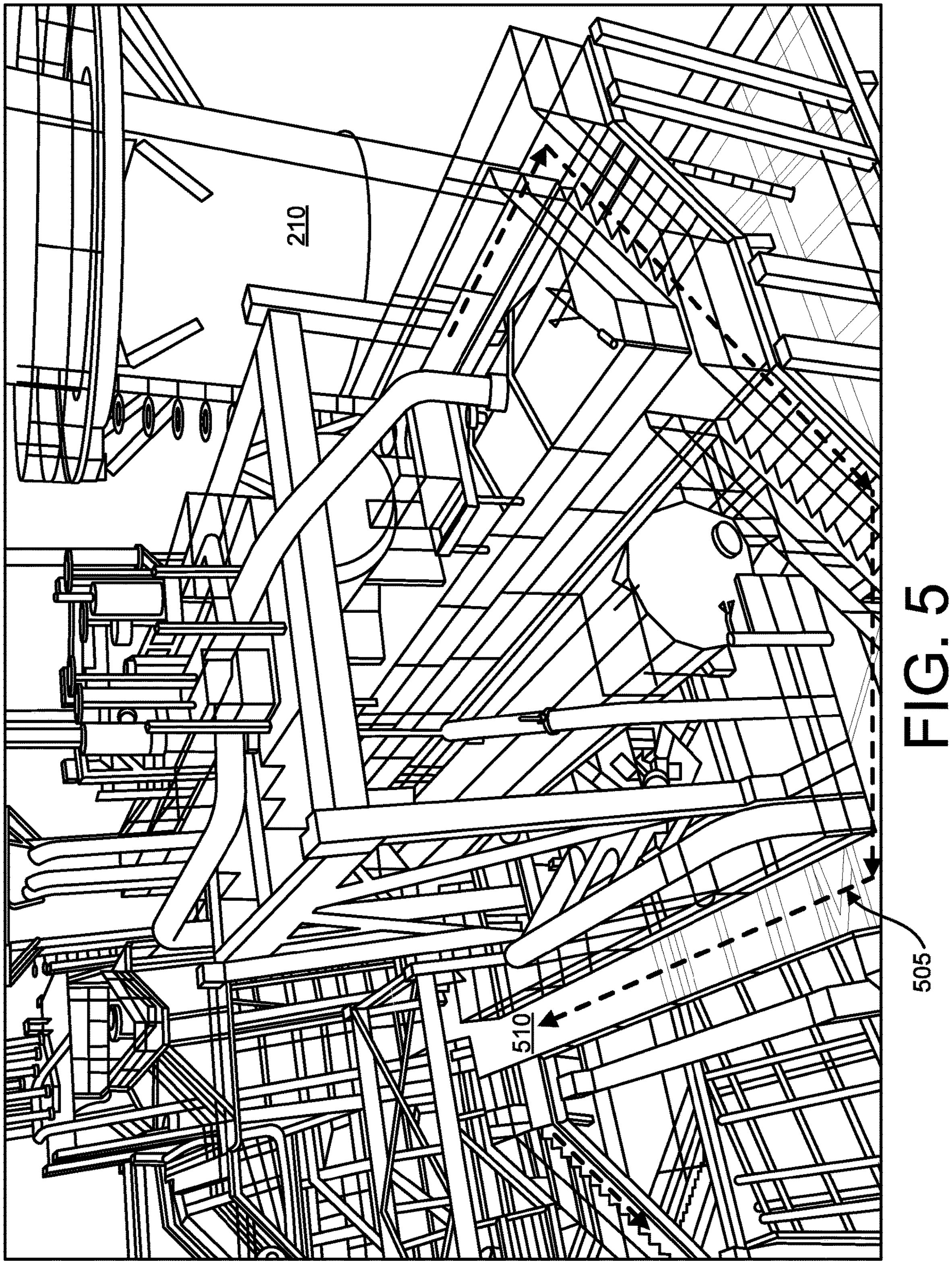
FIG. 5 is an image of an exemplary embodiment of a site diagram of the industrial equipment and an egress route generated by the system of FIG. 1.

FIG. 5 is an image of an exemplary embodiment of a site diagram 500 of the industrial equipment 210 and can be generated by the system of FIG. 1. The site diagram 500 can include an egress route 505 to an emergency assembly point 510.

Figure 6:
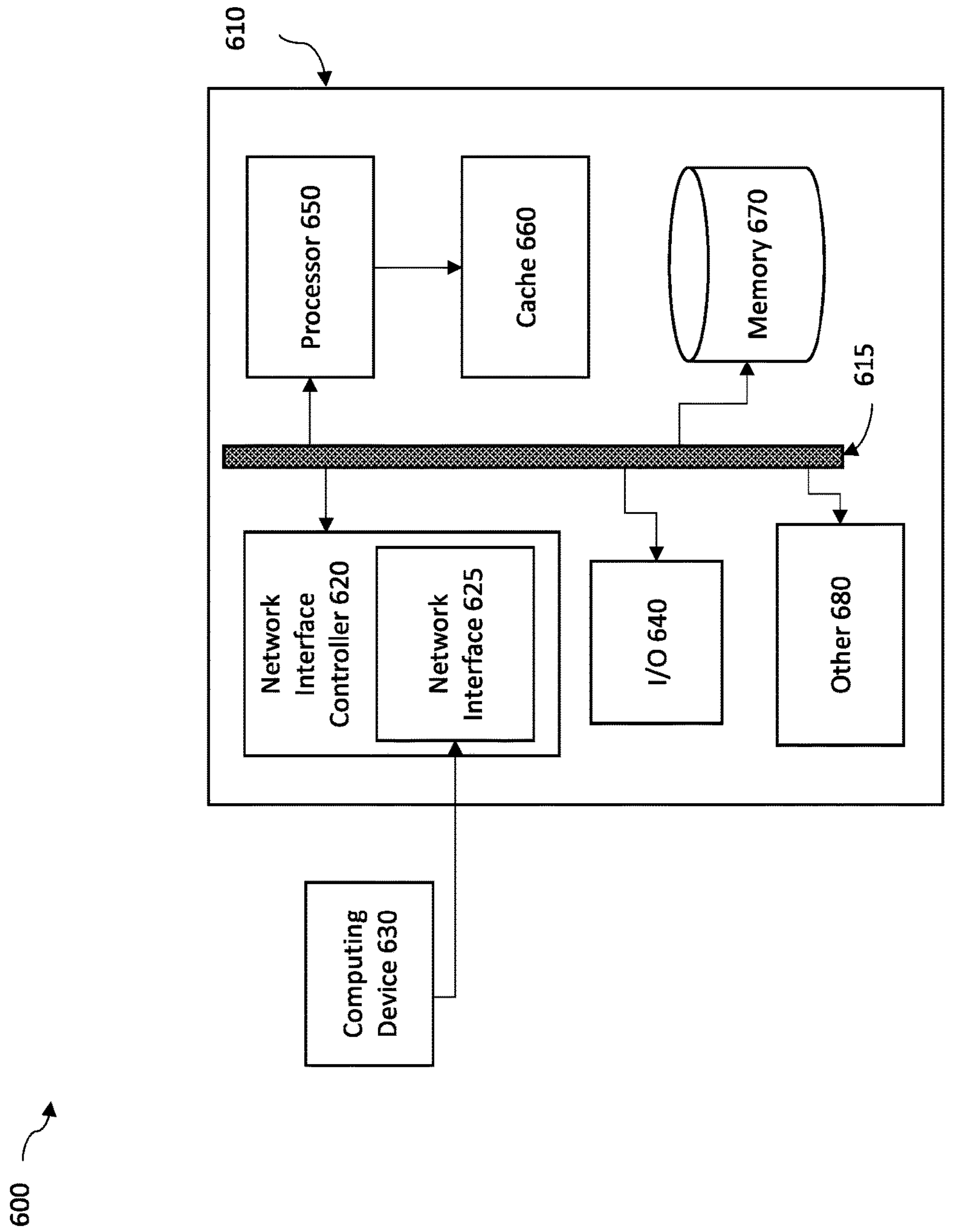
FIG. 6 is a block diagram of an exemplary computing system in accordance with an illustrative implementation of the system of FIG. 1.

FIG. 6 is a block diagram 600 of a computing system 610 suitable for use in implementing the computerized components described herein. In broad overview, the computing system 610 includes at least one processor 650 for performing actions in accordance with instructions, and one or more memory devices 660 and/or 670 for storing instructions and data. The illustrated example computing system 610 includes one or more processors 650 in communication, via a bus 615, with memory 670 and with at least one network interface controller 620 with a network interface 625 for connecting to external devices 630, e.g., a computing device (such as client device 105 or server 110). The one or more processors 650 are also in communication, via the bus 615, with each other and with any I/O devices at one or more I/O interfaces 630, and any other devices 680. The processor 650 illustrated incorporates, or is directly connected to, cache memory 660. Generally, a processor will execute instructions received from memory. In some embodiments, the computing system 610 can be configured within a cloud computing environment, a virtual or containerized computing environment, and/or a web-based microservices environment.

In more detail, the processor 650 can be any logic circuitry that processes instructions, e.g., instructions fetched from the memory 670 or cache 660. In many embodiments, the processor 650 is an embedded processor, a microprocessor unit or special purpose processor. The computing system 610 can be based on any processor, e.g., suitable digital signal processor (DSP), or set of processors, capable of operating as described herein. In some embodiments, the processor 650 can be a single core or multi-core processor. In some embodiments, the processor 650 can be composed of multiple processors.

The memory 670 can be any device suitable for storing computer readable data. The memory 670 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 610 can have any number of memory devices 670.

The cache memory 660 is generally a form of high-speed computer memory placed in close proximity to the processor 650 for fast read/write times. In some implementations, the cache memory 660 is part of, or on the same chip as, the processor 650.

The network interface controller 620 manages data exchanges via the network interface 625. The network interface controller 620 handles the physical, media access control, and data link layers of the Open Systems Interconnect (OSI) model for network communication. In some implementations, some of the network interface controller's tasks are handled by the processor 650. In some implementations, the network interface controller 620 is part of the processor 650. In some implementations, a computing device 610 has multiple network interface controllers 620. In some implementations, the network interface 625 is a connection point for a physical network link, e.g., an RJ 45 connector. In some implementations, the network interface controller 620 supports wireless network connections via network interface port 625. Generally, a computing device 610 exchanges data with other network devices 630, such as computing device 630, via physical or wireless links to a network interface 625. In some implementations, the network interface controller 620 implements a network protocol such as LTE, TCP/IP Ethernet, IEEE 802.11, IEEE 802.16, or the like.

The other computing devices 630 are connected to the computing device 610 via a network interface port 625. The other computing device 630 can be a peer computing device, a network device, or any other computing device with network functionality. For example, a computing device 630 can be an additional client device 105, for example, a client device 105 configured with a ERP, a PTW, or a GPS application. In some embodiments, a computing device 630 can include an additional service device 110. In some embodiments, the computing device 630 can be a network device such as a hub, a bridge, a switch, or a router, connecting the computing device 610 to a data network such as the Internet.

In some uses, the I/O interface 630 supports an input device and/or an output device (not shown). In some uses, the input device and the output device are integrated into the same hardware, e.g., as in a touch screen. In some uses, such as in a server context, there is no I/O interface 630 or the I/O interface 630 is not used. In some uses, additional other components 680 are in communication with the computer system 610, e.g., external devices connected via a universal serial bus (USB).

The other devices 680 can include an I/O interface 640, external serial device ports, and any additional co-processors. For example, a computing system 610 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 610, e.g., a touch screen on a tablet device. In some implementations, a computing device 610 includes an additional device 680 such as a co-processor, e.g., a math co-processor that can assist the processor 650 with high precision or complex calculations.

The subject matter described herein provides many technical advantages. For example, some implementations of the system and methods described herein can provide safe route navigation to and from equipment for operators inspecting or maintaining the equipment. The route navigation can include dynamically updated real-time status and personnel tracking, as well as route re-planning or route adjustments to avoid hazardous areas. The system and methods described herein can also provide alerts or notifications regarding PPE requirements for operators in regard to a specific industrial equipment or location through which operators must pass to reach the equipment or egress from the equipment in the case of an emergency.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions in a non-transitory way, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A navigation system for a dispersed human operator team in a hazardous environment including a plurality of different routes for passage by the dispersed human operator team, the system comprising:

a plurality of mobile hand-held client computing devices respectively carried by each human operator in the dispersed team, each of the plurality of mobile computing devices including a display and each of the plurality of mobile client devices respectively configured to:

automatically track a real-time location of individual ones of the human operators in the dispersed human operator team along respective ones of the plurality of different routes in the hazardous environment; and generate a fault alarm alert based upon inspection of industrial equipment by one of the human operators in the dispersed human operator team, the generated fault alarm alert including industrial equipment data and a particular location in the hazardous environment; and a server computing device communicatively coupled to the plurality of mobile, hand-held client computing devices via a network, the server computing device including at least one data processor and a memory storing non-transitory computer readable instructions, which when executed by the at least one data processor cause the at least one data processor to perform operations comprising:

receiving the generated fault alarm alert;

based on the received industrial equipment data in the generated fault alarm alert and based on each automatically tracked real-time location of the respective human operators in the dispersed operator team in the hazardous environment relative to the particular location included in the fault alarm alert, dynamically generating routing information in the form of a visual depiction of the industrial equipment and visual hazard information for the benefit of the dispersed human operator team responding to the fault alarm at the particular location from different locations in the hazardous environment while traversing respective ones of the plurality of different routes in the hazardous environment, and displaying, on the respective plurality of mobile, hand-held client computing devices, the generated routing information to determine a safe access route or egress route for each human operator in the dispersed team while responding to the generated fault alarm alert at the particular location.

2. The system of claim 1, wherein the plurality of mobile hand-held client computing devices are further configured to scan a QR code and retrieve industrial equipment identification data or the particular location from the scanned QR code.

3. The system of claim 1, wherein the server computing device is further configured to:

in response to the generated fault alarm alert, retrieve maintenance data associated with a past inspection of the industrial equipment at the particular location;

based on the retrieved maintenance data, provide a maintenance procedure to address the fault alarm at the particular location; and display the maintenance procedure to the plurality of mobile hand-held client computing devices.

4. The system of claim 1, wherein the server computing device is further configured to:

generate a visual map including a current location of at least one of the mobile hand-held client computing devices and a navigable path from the current location to a safe destination location for each of the human operators in the dispersed human operator team responding to the fault alarm from the automatically tracked real-time location for each respective one of the human operators; and display the visual map the human operators via the plurality of mobile hand-held client computing devices.

5. The system of claim 4, wherein the visual map further includes at least one personal protective equipment requirement corresponding to a locational hazard in the navigable path to the safe destination location for each of the human operators in the dispersed human operator team.

6. The system of claim 1, wherein the server computing device is further configured to:

in response to the generated fault alarm alert, retrieve an equipment diagram showing schematic drawings of the industrial equipment at the particular location; and display the equipment diagram to the human operators via the plurality of mobile computing devices.

7. The system of claim 6, wherein the equipment diagram identifies hazardous and non-hazardous areas of the industrial equipment.

8. The system of claim 1, wherein the server computing device is further configured to:

in response to the generated alert and the automatically tracked real-time locations of each respective one of the human operators in the dispersed operator team in the hazardous environment, generate a site diagram showing an egress route and an emergency assembly point for each one of the human operators in the dispersed operator team responding the fault alarm from different ones of the automatically tracked real-time locations; and display the site diagram to the human operators via the plurality of mobile computing devices.

9. A navigation method for a dispersed human operator team in a hazardous environment, the method comprising:

receiving, by a data processor of a server device and from one of a plurality of mobile hand-held computing devices, a generated fault alarm alert including industrial equipment data and a particular location in the hazardous environment, wherein the generated fault alarm alert is based upon inspection by one of the human operators in the dispersed human operator team;

automatically tracking, by the plurality of mobile hand-held computing devices using respective location sensors thereof, a real-time location of each of the human operators in the dispersed human operator team along respective routes in the hazardous environment;

generating by the data processor of the server device and based on the received industrial equipment data in the generated fault alarm alert and further based on each automatically tracked real-time location of the respective one of the human operators in the dispersed operator team in the hazardous environment, individualized visual depictions of the industrial equipment and individualized visual hazard information each specific to the automatically tracked real-time location of each individual human operator for the benefit of the dispersed human operator team responding to the generated fault alarm alert from different locations in the hazardous environment; and providing, by the server device, to each of the plurality of mobile-hand held computing devices, the individualized visual depiction of the industrial equipment and the individualized visual hazard information corresponding to a the automatically tracked real-time location of the respective human operator associated with the respective mobile-hand held computing device.

10. The method of claim 9, further comprising scanning a QR code with one of the mobile hand-held computing devices to obtain industrial equipment data relating to the fault alarm alert.

11. The method of claim 9, further comprising:

retrieving, by the server device, maintenance data associated with a past inspection of industrial equipment relating to the fault alarm alert; and providing a maintenance procedure to the mobile hand-held computing devices at each automatically tracked location of the human operators in the hazardous environment.

12. The method of claim 9, further comprising:

generating, by the server device, an individualized map identifying the industrial equipment and a navigable path from a current automatically tracked real-time location of each respective one of the human operators to a safe destination location when responding to the fault alarm alert; and displaying the individualized map on the respective mobile hand-held computing devices.

13. The method of claim 12, wherein the individualized map includes at least one personal protective equipment requirement corresponding to a locational hazard in responding to the industrial equipment from the current automatically tracked real-time location of each of the of the respective human operators in the dispersed human operator team in the hazardous environment.

14. The method of claim 12, wherein the individualized map is dynamically provided in response to changes in the automatically tracked real-time locations of the respective human operators in the dispersed human operator team in the hazardous environment.

15. The method of claim 9, further comprising, in response to the generated fault alarm alert and by the server device, retrieving an equipment diagram showing schematic drawings of the industrial equipment; and displaying the equipment diagram on the mobile handheld computing devices.

16. The method of claim 15, wherein the equipment diagram comprises identifying hazardous and non-hazardous areas of the industrial equipment.

17. The method of claim 9, further comprising, by the server device and in response to the generated alert and the automatically tracked real-time location of each respective one of the human operators in the dispersed human operator team in the hazardous environment, generating a site diagram showing an individualized egress route and an emergency assembly point for each one of the human operators in the dispersed human operator team responding to the fault alarm.

* * * * *